(12) United States Patent
McDowell

(10) Patent No.: US 6,389,459 B1
(45) Date of Patent: May 14, 2002

(54) VIRTUALIZED STORAGE DEVICES FOR NETWORK DISK MIRRORING APPLICATIONS

(75) Inventor: Steven R. McDowell, Lexington, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/207,934

(22) Filed: Dec. 9, 1998

(51) Int. Cl.[7] .................. G06F 15/167; G06F 12/00
(52) U.S. Cl. .................. 709/216; 709/208; 711/100; 711/114; 714/6
(58) Field of Search .................. 709/208, 216; 714/13, 4, 10, 6, 1; 707/10; 711/114, 100

(56) References Cited

U.S. PATENT DOCUMENTS

| | | | | | |
|---|---|---|---|---|---|
| 5,157,663 A | * | 10/1992 | Major et al. | .................. | 714/10 |
| 5,513,314 A | * | 4/1996 | Kandasamy et al. | ........... | 714/6 |
| 5,675,723 A | * | 10/1997 | Ekrot et al. | ..................... | 714/4 |
| 5,696,895 A | * | 12/1997 | Hemphill et al. | .............. | 714/4 |
| 5,764,903 A | * | 6/1998 | Yu | .............................. | 709/208 |
| 5,950,203 A | * | 9/1999 | Stkuis et al. | .................. | 707/10 |
| 5,987,566 A | * | 11/1999 | Vishlitzky et al. | .......... | 711/114 |
| 6,101,497 A | * | 8/2000 | Ofek | ............................ | 707/10 |
| 6,134,673 A | * | 10/2000 | Chrabaszcz | .................. | 714/13 |

* cited by examiner

Primary Examiner—Zarni Maung
(74) Attorney, Agent, or Firm—James M. Stover

(57) ABSTRACT

A system for mirroring data and disk drive device state over a network between a source computer including a first non-shared disk drive storage device and a target computer including a second non-shared disk drive storage device. The system includes layered software drivers installed within the source computer above the device driver for the first disk drive storage device for capturing and examining write requests directed to the first disk drive storage device, and transmitting the write request and extracted device state information to the target computer. Software drivers installed within the target computer above the device driver for the second disk drive storage device direct the received write requests to the second disk drive storage device, and the received device state information to volatile storage within the target computer.

7 Claims, 3 Drawing Sheets

VIRTUALIZED STORAGE DEVICES FOR NETWORK DISK MIRRORING APPLICATIONS

RELATED APPLICATIONS

The present application is related to United States patent application Ser. No. 09/144,753, titled "FILE SYSTEM FILTER DRIVER APPARATUS AND METHOD" by Steven McDowell, filed on Sep. 1, 1998, now U.S. Pat. No. 6,266,785. United States patent application Ser. No. 09/144,753, assigned to NCR Corporation, is incorporated herein by reference.

FIELD OF THE INVENTION

The present invention relates to clustered computer systems and, more particularly, to methods for mirroring disk drives within a network.

BACKGROUND OF THE INVENTION

The increased reliance by business on On-Line Transaction Processing and Decision Support Systems has increased the demand for high availability systems since these systems are critical to the functioning of day-to-day activities in many businesses. These systems are not only essential for the support of normal daily operations, but they also store critically important customer and corporate data. Continuous availability is no longer an ideal; it is a necessity for many companies. Longer workdays, expansion into new markets and customer demand for more efficient service create an expanded requirement for increased system availability. Users are demanding a means of ensuring very high availability of their applications and the access to data that permits them to accomplish their tasks and provide the highest levels of customer service. Interruption of workflow due to system failure is expensive and it can cause the loss of business. The need to increase computer system availability is becoming one of businesses key concerns.

Implementation of client/server computing is growing throughout today's businesses—for key business applications as well as electronic mail, distributed databases, file transfer, retail point-of-sale, inter-networking, and other applications. It is possible for companies to gain competitive advantages from client/server environments by controlling the cost of the technology components through economies of scale and the use of clustered computing resources. There is a boost in productivity when businesses have high availability and easy access to information throughout the corporate enterprise.

Computer system availability and reliability are improved when multiple servers are utilized together with a "fail-over" scheme such as provided by NCR Corporation's LifeKeeper product. In such a system, should one server fail, the functions and applications associated with the failed server are transferred to one or more of the remaining operational or standby servers.

An important component of a high-availability client/server system is a reliable, fault-tolerant data storage system. In some networked or "clustered" multiple server arrangements, the physical data storage system may be a shared RAID (Redundant Array of Inexpensive Disks) disk array system, or a shared pair of disk drives or disk arrays operating in a mirrored arrangement.

A computer system including multiple servers and a pair of shared disk drives is shown in FIG. 1. FIG. 1 provides a diagram of clustered or networked computers having a primary server 101 and a secondary server 103 in a fail-over pair arrangement. Primary server 101 is the preferred application server of the pair, and secondary server 103 preferably provides fail-over protection for the primary server. The primary and secondary servers are coupled through a network bus system 105 to a plurality of client computers 107 though 109. The primary and secondary servers 101 and 103 each share access to a pair of disk storage devices 111 and 113. Disk storage devices 111 and 113 are SCSI (Small Computer Systems Interface) disk drives or disk arrays connected to servers 101 and 103 through a pair of SCSI busses 115 and 117.

Disk storage devices 111 and 113 are two equal-capacity storage devices that mirror each other. Each storage device contains a duplicate of all files contained on the other storage device, and a write or update to one storage device updates both devices in the same manner. In the event that either storage device fails, the data contained therein remains available to the system from the operational mirror storage device.

In other client/server arrangements, the physical storage devices for the primary and secondary servers may be separate, non-shared, physical storage devices. Implementation of a non-shared, storage device mirroring process over a network is a more complicated process than mirroring with a pair of shared storage devices since some hardware clustering technologies rely on the physical state of the attached storage device to manage the cluster. Microsoft Corporation's Cluster Server product (MSCS), for example, uses the SCSI Reserve/Release protocol to manage the ownership of shared disks between members of the cluster. Without shared storage devices, and no SCSI control of the underlying physical disk drives, then there is no cluster with MSCS. Furthermore, since the SCSI Reserve/Release protocol operates with physical disk drives, it would not be possible to mirror a storage unit smaller than the physical disk drive, such as a partition.

In order to implement a non-shared, storage device mirroring process over a network, the clustering technology that is relying on a shared physical storage device must be "fooled" into believing that there is a shared device.

A network based file system volume replication scheme where the contents of the file system stored on a primary physical storage media are also copied to a secondary physical storage media is commercially available from NCR Corporation, assignee of the present application, under the product name "Extended Mirroring".

OBJECTS OF THE INVENTION

It is therefore an object of the present invention to provide a new and useful method and mechanism for mirroring storage devices over a network.

It is another object of the present invention to provide such a method for mirroring non-shared storage devices.

It is yet another object of the present invention to provide a new and useful method and mechanism for mirroring non-shared storage device state within a clustered system by representing the storage device as a shared drive to the cluster engine.

It is still a further object of the present invention to provide a new and useful method and mechanism for mirroring disk partitions over a network.

SUMMARY OF THE INVENTION

There is provided, in accordance with the present invention, a system for mirroring data and disk drive device state over a network between a source computer including a first non-shared storage volume and a target computer including a second non-shared storage volume.

The source and target storage volumes reside on first and second physical disk drive devices, respectively. The source computer includes a file system mirror driver, installed above the device driver for the first disk drive device, for capturing write requests directed to the first storage volume and transmitting the write requests to the target computer. A state filter driver, also installed above the device driver for the first disk drive device, examines the write requests directed to the first storage volume to determine a device state for the first physical disk drive and transmits the device state to the target computer.

The target computer includes a device state storage device; a file system mirror driver for receiving the write requests from the source computer and directing the write requests to the second storage volume; and a state mirror driver for receiving the device state from the source computer and storing the device state within the device state storage device.

The above and other objects, features, and advantages of the present invention will become apparent from the following description and the attached drawings.

DETAILED DESCRIPTION OF THE PREFERRED EMBODIMENT

Figure 1:
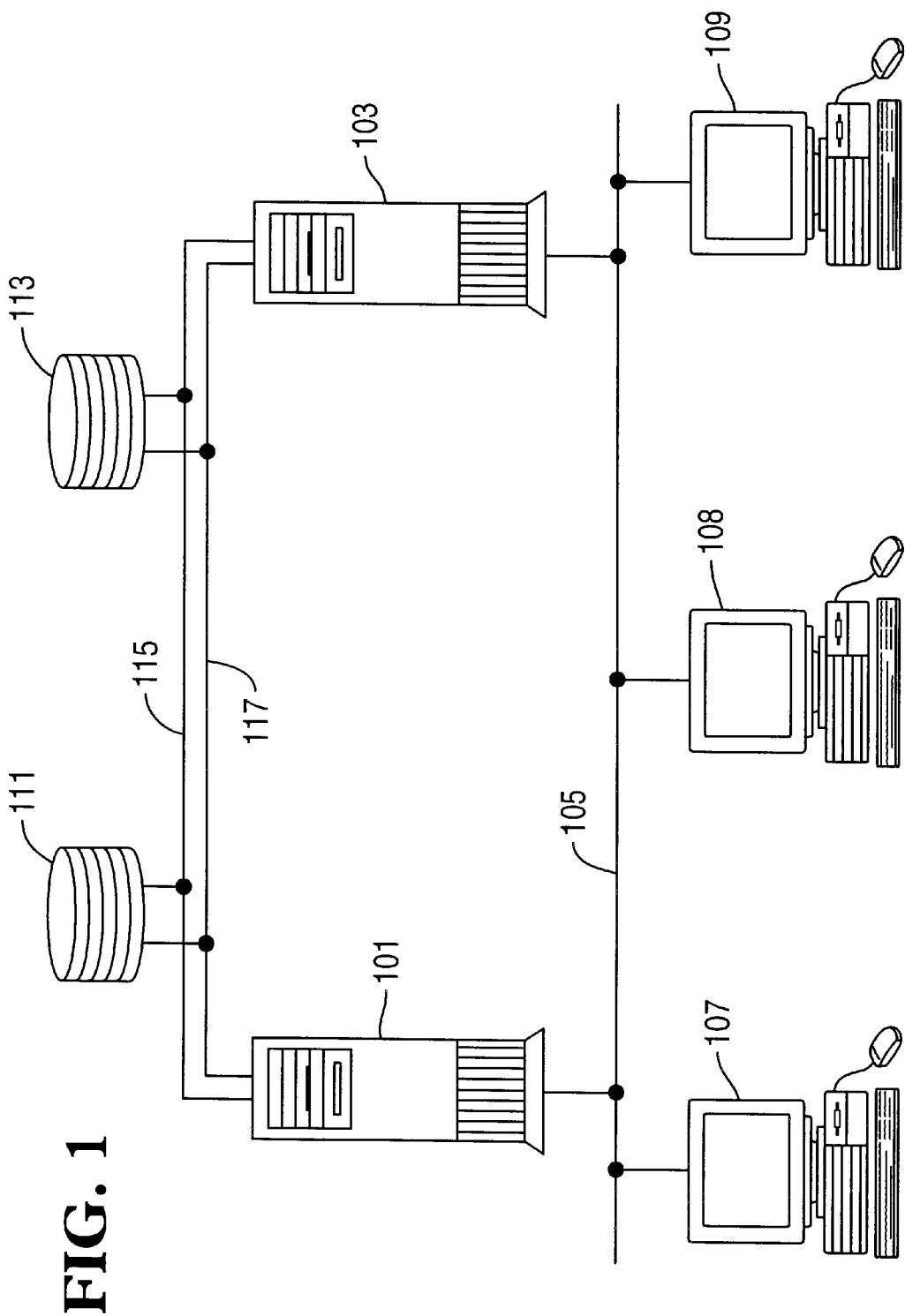
FIG. 1 is a diagram of a clustered computer system including primary and secondary servers and a pair of shared disk storage devices.
Figure 2:
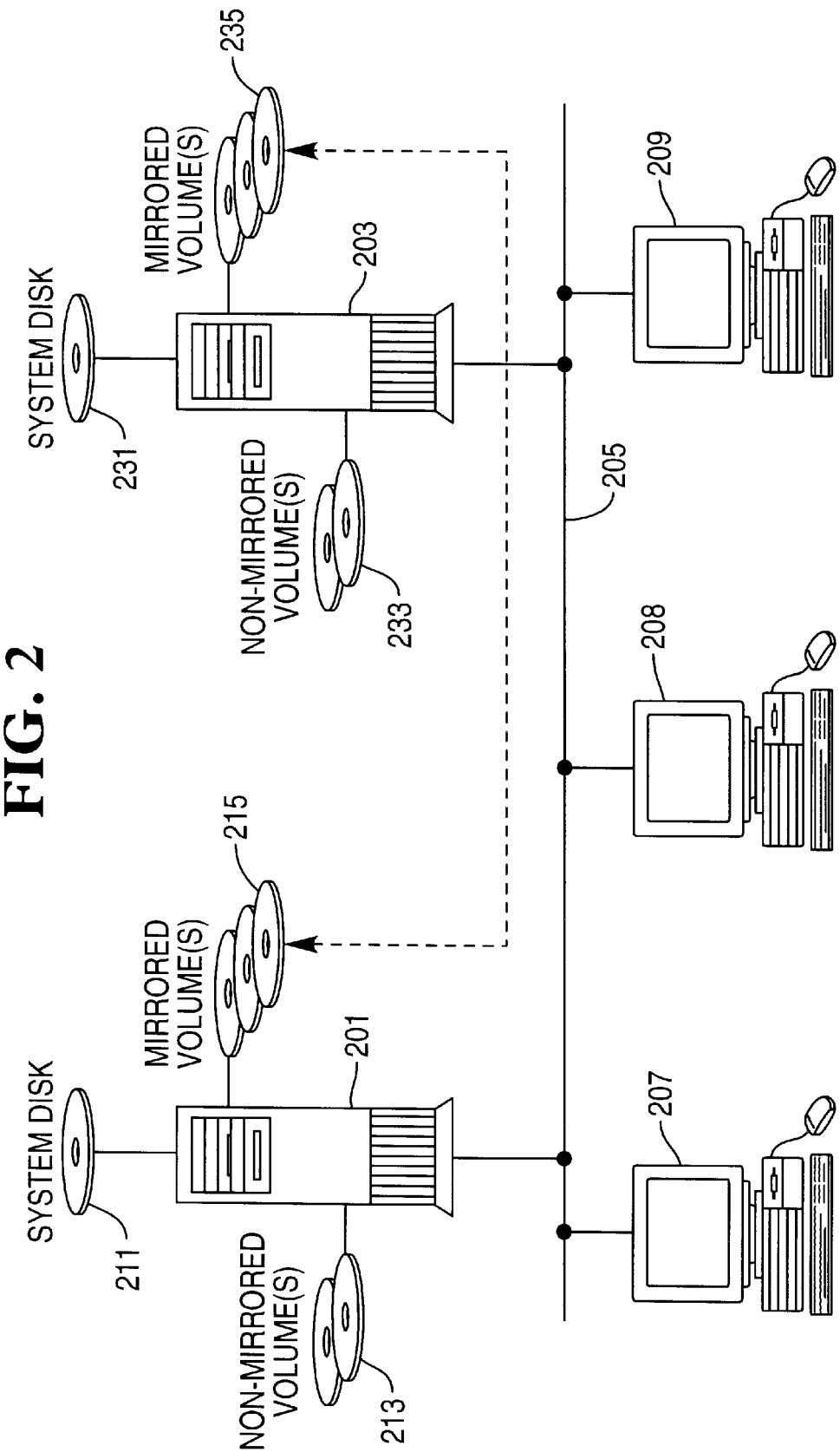
FIG. 2 is a diagram of a clustered computer system including primary and secondary servers, primary and secondary non-shared disk storage devices, and a disk volume mirroring mechanism in accordance with the present invention.

FIG. 2 provides an illustration of a clustered computer system including a primary server 201 and a secondary server 203. Primary server 201 includes three types of disk storage volumes: system volume 211, nonmirrored volumes 213, and mirrored volumes 215. Similarly, secondary server 203 includes system 231, non-mirrored 233, and mirrored 235 disk storage volumes. These disk volumes may be physical disk drives or disk drive partitions. The primary and secondary servers are coupled through a network bus system 205 to a plurality of client computers 207 though 209.

The system shown is provided with software-based mirroring functionality between the two servers and their mirrored volumes over a Local Area Network (LAN). Client computers can read or write only to mirrored volumes 215 on primary server 201. The corresponding volumes 235 on secondary server 203 are locked preventing access to data unless a failed state is detected on the primary server, a critical consideration when implementing a High Availability solution since data integrity is a major factor.

The primary and secondary mirrored volumes are not required to have the same physical size or type of drives. When partitioned, however, it is recommended that the secondary volumes be slightly larger since unused disk space is wasted. Application requirements normally will determine the size of the volumes. The recommended maximum size for each volume is 1 Gigabyte (Gb). Larger volumes will impact on the amount of time it takes to re-synchronize the systems when the mirror is broken.

Once the volume mirrors are established, all data writes submitted to the primary volumes are mirrored across the network to the secondary volumes. Every disk write to the primary mirror volumes must be captured on the primary server and transmitted over the network to the secondary server and secondary mirror volumes. Some fail-over engines, such as NCR Corporation's LifeKeeper product, provide this capability. For others, however, such as Microsoft Corporation's Cluster Server product, the physical state of the mirrored drive must also be mirrored.

Figure 3:
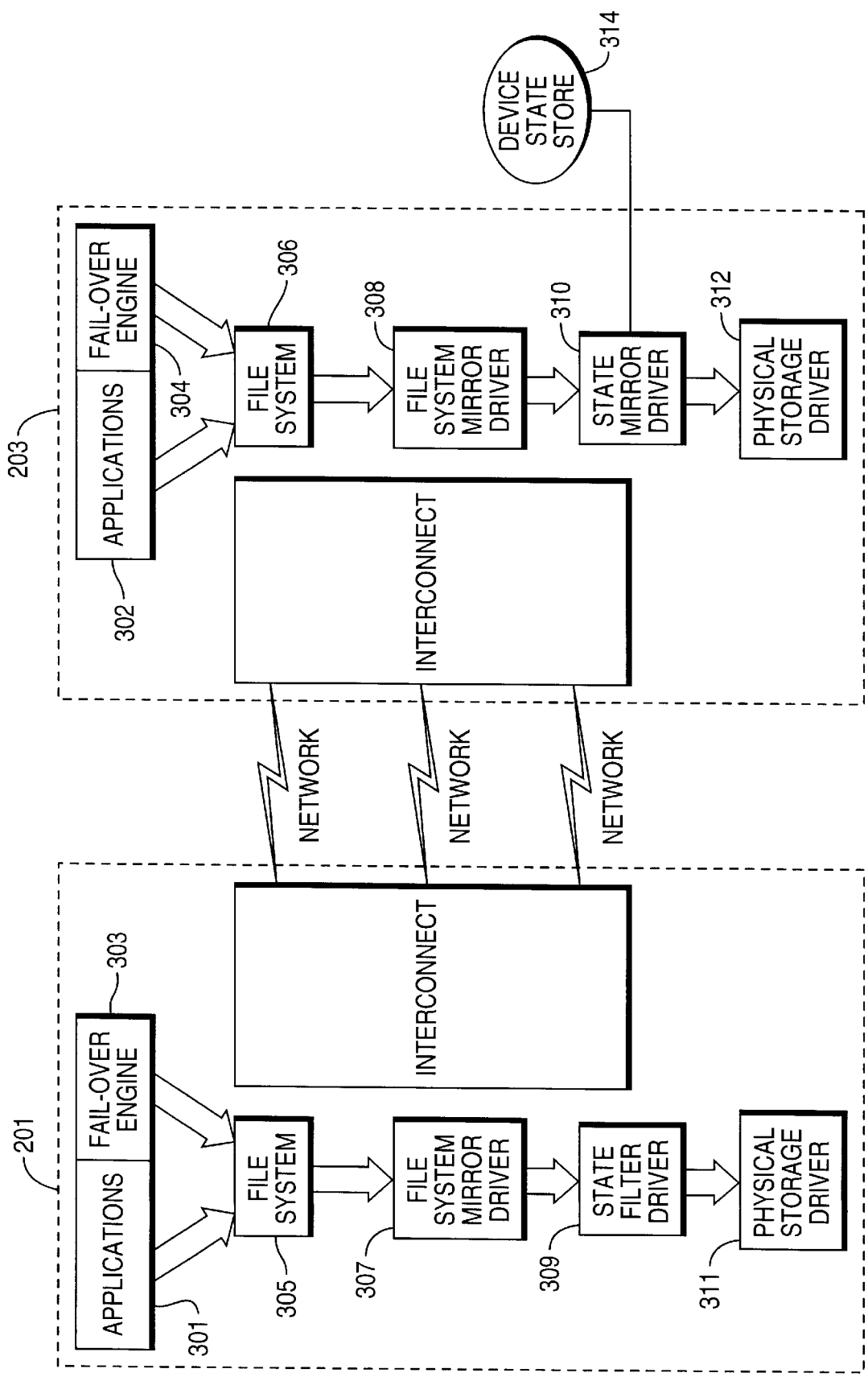
FIG. 3 is a diagram of the operating system hierarchy and the location of a file system mirror driver and a state mirror driver therein in accordance with the present invention.

The mechanism for replicating disk writes and device states is illustrated in the operating system hierarchy diagram of FIG. 3. Mirroring disk write operations and physical device states requires that filters be inserted above the physical device driver on the primary and secondary servers.

Referring to FIG. 3, a diagram of the operating system hierarchy within servers 201 and 203 and the location of a file system mirror driver, a state filter driver, and state mirror driver within servers 201 and 202 in accordance with the present invention is shown. Within server 201, block is 301 represents application software, block 303 represents a conventional fail-over engine, block 305 represents a file system driver, block 307 represents the file system mirror driver, block 309 represents the state filter driver and block 311 represents the driver of physical storage media. Similar elements exist within secondary server 203. Block 302 represents application software, block 304 represents a conventional fail-over engine, block 306 represents a file system driver, block 308 represents the file system mirror driver, block 310 represents the state mirror driver and block 312 represents the driver of physical storage media. Secondary server 203 additionally includes a device state store 314, which may reside in volatile or non-volatile memory.

As illustrated in FIG. 3, file system mirror driver 307 and state filter driver 309 preferably are installed in layers between the file system driver 307 and the physical storage driver 311. In this manner, the file system mirror driver 307 and state filter driver 309 may manipulate data before it is passed to the physical storage driver. Modern operation systems allow for such layered driver arrangements. The diagram of FIG. 3 illustrates the location of drivers 307 and 309 within a typical driver stack on a Windows NT server system. The file system driver 308 and state mirror driver 310 within secondary server 203 are similarly arranged.

The file system and state drivers within servers 201 and 203 preferably incorporate a network file system engine such as CIFS/SMB for Windows NT which allows the drivers within the primary and secondary servers to communicate with each other through normal network operation system channels. Standard network file system technologies are preferably used to allow the underlying file system model of locking and synchronization to be used without any enhancement.

File system mirror drivers 307 and 308 provide the mechanism for mirroring data between primary mirrored disk volumes 215 and the secondary mirrored disk volumes 235. After the volume mirrors are established, the drives on the primary and secondary servers are synchronized, and both servers are up and running, volume mirroring proceeds as follows:

1. After the initial mirror is established, the system locks out all user access to the secondary mirrored volumes. Reads and writes are not allowed to the mirrored volumes 235 on the secondary server computer. The primary server mirror volumes 215 are accessible for both reads and writes.

2. Both mirrored and non-mirrored volume read operations arriving at the file system mirror driver 307 on the primary server are passed on and allowed to complete normally without intervention. Reads of a mirrored volume on the secondary server are not allowed.

3. Whenever the primary server receives a write request, the system first determines whether the request is for a mirrored volume. If not, the write is allowed to complete normally without any further intervention. If, however, the primary server write request is for a mirrored volume, the request is sent to the secondary mirrored volume first. The secondary system executes the write request on its mirrored volume and then sends the status of the write back to the primary server. The primary server does nothing on the write request until the secondary server returns its status.

4. When the secondary server returns a successful status, the primary server executes the write to its mirrored volumes 215 and returns to the caller. Should an error occur while the secondary server executes its mirrored volume write, the write process on the secondary server is terminated. The primary server will then complete the write request on its mirrored volume and the status of the mirror then changes from Normal to Broken.

5. The secondary mirror volumes are locked to all users once the mirror is created. Locking the secondary mirror volumes ensures that data on both the primary and secondary volumes is not corrupted through an inadvertent write to the secondary mirrored volumes. When a volume mirror is deleted, the secondary volumes are unlocked and full access is again allowed to both the primary and secondary volumes.

State mirror drivers 309 and 310 provide the mechanism for mirroring physical state between disk mirror volumes 215 and the volume mirrors 235. During system operation, every device command that is sent to the primary physical storage device is examined and, if the command is required to be mirrored, e.g., the SCSI Reserve/Release commands, the command is sent across the network to the secondary server and mirror volume.

On the secondary server, the mirrored physical command is retained within device state store 314 until a command arrives that "undoes" the stored command. For example, a stored SCSI Reserve command will be kept on the secondary server until the arrival of a SCSI Release command. A SCSI Release command reverses the effects of a SCSI Reserve command, erasing the state information retained by the Reserve command. A number of storage device commands would be retained and erased in this same manner. Device commands that actually modify on the disk could be executed on the mirrored drive.

Following the occurrence of a fail-over from the primary server to the secondary server, the stored state is executed on the secondary physical storage device to place it into the state that the clustering engine expects it to be in.

It can thus be seen that there has been provided by the present invention a new and useful system for mirroring non-shared storage devices over a network. The system mirrors write requests directed to a first storage device as well as the physical device state of the first storage device.

Although the presently preferred embodiment of the invention has been described, it will be understood that various changes may be made within the scope of the appended claims.

What is claimed is:

1. A computer system, comprising:

a first server computer including a first storage volume;

a second server computer including a second storage volume;

a communication network connecting said first and second server computers; and a network operating system implemented within said first and second server computers which supports layered drivers;

said first server computer including:
    a file system mirror driver for capturing write requests directed to said first storage volume and transmitting the write requests to said second server computer; and
    a state filter driver for examining device commands directed to said first storage volume, determining a device state for the first storage volume, and transmitting said device state to said second server computer; and said second server computer including:
    a storage device;
    a file system mirror driver for receiving the write requests from said first server computer and directing the write requests to said second storage volume; and
    a state mirror driver for receiving said device state from said first server computer and storing said device state in said storage device.

2. The computer system in accordance with claim 1, wherein:

said communications network connecting said first and second server computers comprises a clustered computer system.

3. The computer system in accordance with claim 2, wherein:

said network operating system comprises Microsoft Corporation's Windows NT operating system.

4. The computer system in accordance with claim 1, wherein:

said first storage volume comprises a first disk drive; and said second storage volume comprises a second disk drive.

5. A computer system, comprising:

a first server computer including a first non-mirrored storage volume and a first mirrored storage volume;

a second server computer including a second non-mirrored storage volume and a second mirrored storage volume;

a communication network connecting said first and second server computers; and a network operating system implemented within said first and second server computers which supports layered drivers;

said first server computer including:
    a file system mirror driver for capturing write requests directed to said first mirrored storage volume and transmitting the write requests to said second server computer; and
    a state filter driver for examining device commands directed to said first storage volume, determining a device state for the first storage volume, and transmitting said device state to said second server computer; and said second server computer including:

a storage device;

a file system mirror driver for receiving the write requests from said first server computer and directing the write requests to said second mirrored storage volume; and a state mirror driver for receiving said device state from said first server computer and storing said device state in said storage device.

6. A mirrored storage system for a clustered computer system, said clustered computer system including a first server computer including a first storage volume; a second server computer including a second storage volume; a communication network connecting said first and second server computers; and a network operating system implemented within said first and second server computers which supports layered drivers; said mirrored storage system comprising:

within said first server computer:

a file system mirror driver for capturing write requests directed to said first storage volume and transmitting the write requests to said second server computer; and a state filter driver for examining device commands directed to said first storage volume, determining a device state for the first storage volume, and transmitting said device state to said second server computer;

within said second server computer:

a storage device;

a file system mirror driver for receiving the write requests from said first server computer and directing the write requests to said second storage volume; and a state mirror driver for receiving said device state from said first server computer and storing said device state in said storage device.

7. A method for mirroring disk volumes over a networked computer system, said networked computer system including a primary server computer including a primary storage volume; a secondary server computer including a secondary storage volume; a communication network connecting said primary and secondary server computers; and a network operating system implemented within said primary and secondary server computers which supports layered drivers; said method comprising the steps of:

capturing write requests directed to said primary storage volume within said primary server computer and transmitting the write requests to said secondary storage volume within said secondary server computer;

examining device commands directed to said primary storage volume and transmitting a device state to said secondary server computer; and storing said device state in a storage device within said secondary server computer.

* * * * *